United States Patent
Kim et al.

(10) Patent No.: US 10,963,890 B1
(45) Date of Patent: Mar. 30, 2021

(54) MANAGEMENT OF COMMUNICATIONS AND SOCIAL NETWORKS IN AREA-SPECIFIC WIRELESS REGIONS

(75) Inventors: John Kim, Centreville, VA (US); Bryan Goldberg, Vienna, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 2449 days.

(21) Appl. No.: 13/349,823

(22) Filed: Jan. 13, 2012

(51) Int. Cl.
*G06Q 30/02* (2012.01)
(52) U.S. Cl.
CPC .................................. *G06Q 30/02* (2013.01)
(58) Field of Classification Search
CPC ........................... G06Q 30/0267; G06Q 30/02
USPC ....................................................... 705/11–44
See application file for complete search history.

(56) References Cited

U.S. PATENT DOCUMENTS

| | | | | |
|---|---|---|---|---|
| 6,856,820 B1* | 2/2005 | Kolls | ...................... | B60R 25/04 340/853.1 |
| 7,720,037 B2* | 5/2010 | Bill | .............................. | 370/338 |
| 8,107,931 B1* | 1/2012 | Delker et al. | .............. | 455/414.1 |
| 2007/0121843 A1* | 5/2007 | Atazky et al. | ........... | 379/114.13 |
| 2010/0063993 A1* | 3/2010 | Higgins | ................. | G06Q 10/10 709/203 |
| 2011/0029363 A1* | 2/2011 | Gillenson | .............. | G06Q 30/02 705/14.15 |

* cited by examiner

*Primary Examiner* — Rutao Wu
*Assistant Examiner* — Zahra Elkassabgi
(74) *Attorney, Agent, or Firm* — Armis IP Law, LLC

(57) ABSTRACT

A network management application creates one or more maps representing social networks of participants that currently reside, have resided, or plan to reside in a region of wireless coverage provided by a wireless access point. The network management application updates a map to reflect changes in the social network in accordance with movement of the participants in and out of the region of wireless coverage. For example, if a subscriber moves outside the region, the respective subscriber is removed from the social network. If the subscriber moves into the region of wireless coverage, the respective subscriber is added to the social network. Inclusion of a subscriber in the social network can depend on factors such as whether a subscriber is a member of an organization. The wireless base station communicates information to the participants of the social network in accordance with one or more rules.

32 Claims, 7 Drawing Sheets

MANAGEMENT OF COMMUNICATIONS AND SOCIAL NETWORKS IN AREA-SPECIFIC WIRELESS REGIONS

BACKGROUND

Conventional RF (Radio Frequency) technology has been used for many years to connect wireless devices such as phones, laptops, etc., to a core landline network and/or other wireless networks. Today, such networks support many different types of connection services such as voice communications, high-speed data services, Wi-Fi connectivity, and so on.

Conventional cellular networks typically include a land area that has been divided into so-called cellular regions. A single base station resides in each cell. Often, the base station is connected to a landline network and supports communication with one or more wireless subscribers operating in a region covered by the cell. Accordingly, via a connection with the base station, a wireless subscriber operating a device such as a cell phone in the cell is able to communicate through the base station to a landline network via a wireless link.

More recent wireless technology includes so-called Wi-Fi base stations or access points. Wi-Fi access points typically have the ability to provide short-range wireless coverage compared to long-range coverage provided by conventional cell towers. As an example, a Wi-Fi base station may provide indoor radial coverage on the order of 10-30 meters. Outdoor use of a Wi-Fi base station typically provides a greater range of coverage.

As discussed above, different types of base stations can be used to support wireless connectivity between subscribers and a core network. In addition to providing connectivity to a core network, it is sometimes desirable to track the locations of respective subscribers in a network environment.

One way to precisely track the locations of subscribers is to deploy so-called GPS (Global Positioning System) technology in each of the mobile devices. In such an instance, the mobile device obtains position information from satellites and relays to determine its location. Each of the mobile devices can be configured to transmit its location information over a network connection to a server.

In one conventional application, the server uses the location information received from the subscribers to perform a function such as communicating with a respective mobile device and display a visual indication of a current location of the subscriber on a map. Accordingly, a subscriber can use his/her mobile device as a navigational guide.

BRIEF DESCRIPTION OF EMBODIMENTS

Conventional techniques of tracking a location of subscribers in a network environment suffer from a number of deficiencies. For example, conventional techniques rely on use of so-called GPS systems to identify an exact location of each subscriber in a community of multiple subscribers. Although it is possible to receive GPS information from each of multiple subscribers and track their locations, this technique is very complex and requires considerable resources to implement. For example, each of the wireless devices must include a GPS system. A server must keep track of precise and rapidly changing location information for each subscriber.

Also, GPS technology doesn't work indoors. In contrast to conventional techniques, embodiments herein include tracking individual locations of subscribers indoors and outdoors in each of multiple wireless coverage regions. As discussed below, embodiments herein solve this problem by determining one's location per wireless AP connection.

Embodiments herein deviate with respect to conventional applications. For example, one embodiment herein includes unique ways of keeping track of one or more subscribers that reside within a particular region of wireless coverage provided by an access point.

In accordance with one embodiment, a community of subscribers present in the region of wireless coverage can form a social network. In such an embodiment, the social network constantly changes over time depending on a parameter such as movement of the subscribers in and out of the region of wireless coverage. Inclusion in a social network can depend on any suitable criteria.

An access point as discussed herein can be configured to perform different functions with respect to members of a social network of subscribers in a region. For example, in one embodiment, the access point in a network creates a dynamic social network and transmits information to the subscribers based on one or more factors such as presence of the subscribers in the region of wireless coverage, association of one subscriber to another, a history of actions by the subscribers, etc.

More specifically, in one embodiment, a wireless base station operates in a network environment to support communications between subscribers and a core network. A network management application (located in any suitable location such as a the wireless base station, remote server, etc.) creates a map representing a social network of participants that currently reside in a region of wireless coverage provided by the wireless base station. Inclusion in a social network map may be contingent upon a condition such as detecting that a respective subscriber communicates with or through the access point. The network management application can be configured to constantly update the map to reflect changes in the social network in accordance with movement of the participants in and out of the region of wireless coverage.

As previously mentioned, conventional GPS may require transmission of a substantial amount of extra data to keep track of a location of a subscriber. Embodiments herein can include deducing that a subscriber is in a wireless coverage region based on the general communications transmitted from the subscriber. Therefore, data overhead is needed.

Based on updating the map, the network management application keeps track of subscribers that are currently part of the social network. In one embodiment, the wireless base station regulates transmission of communications to the participants in a respective social network based on one or more rules.

In accordance with further embodiments, for a region of wireless coverage provided by a respective wireless access point, the network management application can keep track of multiple dynamic social networks. More specifically, the network management application can add subscribers to a particular social network in a given wireless coverage region depending on attributes of the subscriber using the access point.

That is, inclusion in a social network (or respective map) can depend on attributes of a particular subscriber, a type of communications transmitted by the subscriber, etc. By way of a non-limiting example, a first map can be used to keep track of subscribers in the wireless region that share a first common attribute (e.g., persons that are friends in a social network on the Internet); a second map can be used to keep track of subscribers in the wireless region that share a second common attribute (e.g., persons that purchase items from the retail business in the wireless region); a third map can be used to keep track of subscribers in the wireless region that share a third common attribute (e.g., persons that belong to the same sports organization or fitness center); and so on.

A subscriber in the region of wireless coverage may be included in one or more of the social networks depending on their attributes.

In accordance with another example embodiment, a wireless access point monitors the region for communications. In such an embodiment, the access point receives a message transmitted over a wireless link from a subscriber to a wireless access point. The wireless access point provides wireless connectivity between a set of multiple subscribers including the subscriber and a core network. A network management application (residing in the access point or at a remote location with respect to the access point) analyzes the message received by the access point to identify the subscriber as a sender of the message. Based on the message or detecting that the mobile device sent a message, the network management application populates a map to indicate that the subscriber resides in a wireless coverage region of the wireless access point. As previously mentioned, the network management application can be configured to keep track of any new subscribers that enter the region of wireless coverage and create one or more social networks.

In response to a condition such as detecting presence of the first subscriber within the wireless coverage range as specified by the map, the network management application can be configured to initiate transmission of a communication from the wireless access point to the subscriber.

As further described herein, the network management application can be configured to initiate distribution of different communications to the subscribers in the social network depending on parameters such as presence of the subscribers in the region of wireless coverage, attributes of the subscribers, willingness of the subscribers to receive messages from other subscribers in the region, previous relationships amongst the subscribers, common interests of the subscribers, etc.

In accordance with another embodiment, a wireless access point provides connectivity between subscribers and a core network via one or more wireless connections. A network management application receives advertisement information pertinent to the access point. In one embodiment, the network management application associates the advertisement information to the wireless access point. The advertisement information can indicate a venue (e.g., resource, company, event, building, etc.) located within a wireless coverage region of a wireless access point.

Again, the network management application can monitor a presence of subscribers in a region and populate a map to indicate the subscribers that currently reside within the wireless coverage region of the wireless access point. From the wireless access point, and in response to a condition such as detecting that a subscriber currently resides within the wireless coverage region, the wireless access point transmits one or more communications including the advertisement information to one or more of the respective subscribers in the map. Accordingly, via messages to the mobile devices, the subscribers can be apprised of different events or resources located within or nearby a wireless coverage region.

As a more example, a subscriber may operate a mobile device in a coffee shop. An access point to which the subscriber is currently connected may provide coverage only in the coffee shop. The subscriber in the coffee shop can receive messages pertaining to the coffee shop (e.g., sales, promotions, current or future events, etc.) or messages pertaining to businesses nearby the coffee shop. In further embodiments, the subscriber in the coffee shop can receive messages pertaining to businesses located outside (e.g., or nearby) a coverage region of the access point that provides wireless connectivity to the subscriber in the coffee shop.

By way of further non-limiting example, subscribers can freely access outdoor and indoor WiFi access points. The WiFi wireless coverage resulting from these deployments can be of limited range such as less than 100 meters, to serve a fairly well defined service area. One embodiment herein includes leveraging the compact WiFi coverage and creating a system supporting area-specific advertising and social-networking.

For example, in accordance with such embodiments, the proposed system defines a social community as users connected to the same WiFi access point or a group of access points. In contrast to conventional social networking platforms, the community of subscribers in a particular wireless coverage region is area specific and its membership base constantly changes as subscribers enter and leave the coverage area. In other words, a community of subscribers in a wireless coverage region is not static, but changes over time.

Certain embodiments herein allow subscribers to share area-specific information such as reviews, chats, sale information, etc., to other current and future nearby subscribers. Businesses can utilize the platform as discussed herein to distribute area-specific advertisements to audiences (i.e., subscribers) located in specific wireless coverage regions. Such embodiments are useful because they enable transmission of area-specific advertisements to subscribers in the immediate area, increasing the likelihood that the subscriber will perform a transaction with the business. Thus, advertising can be more effective and beneficial to both businesses and subscribers.

These and other more specific embodiments are disclosed in more detail below.

Note that embodiments herein can include a configuration of one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory (i.e., non carrier wave) computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

For example, one embodiment includes a computer readable storage medium or computer readable hardware medium having instructions stored thereon. The instructions, when executed by a processor of a respective computer device, cause the processor or multiple processors to: receive a message transmitted over a wireless link from a first subscriber to a wireless access point, the wireless access point providing wireless connectivity between a set of multiple subscribers including the first subscriber and a core network; analyze the message to identify the first subscriber; populate a map to indicate that the first subscriber resides in a wireless coverage region of the wireless access point; and transmit a communication from the wireless access point to the first subscriber, the communication transmitted to the first subscriber in response to detecting presence of the first subscriber within the wireless coverage range as specified by the map.

Another embodiment herein includes a computer readable storage medium or computer readable hardware medium having instructions stored thereon; the instructions when executed by a processor of a respective computer device, cause the processor or multiple processors to: receive advertisement information directed to a venue located within a wireless coverage region of a wireless access point, the wireless access point providing connectivity between subscribers and a core network; associate the advertisement information to the wireless access point; populate a map to indicate that a subscriber currently resides within the wireless coverage region of the wireless access point; and from the wireless access point, and in response to detecting that the subscriber currently resides within the wireless coverage region, transmit a communication including the advertisement information to the subscriber.

Yet another embodiment herein includes a computer readable storage medium or computer readable hardware medium having instructions stored thereon; the instructions when executed by a processor of a respective computer device, cause the processor or multiple processors to: operate a wireless base station in a network environment; create a map, the map representing a social network of participants that currently reside in a region of wireless coverage provided by the wireless base station; update the map to reflect changes in the social network in accordance with movement of the participants in and out of the region of wireless coverage; and from the wireless base station, initiate communications with the participants of the social network.

The ordering of the steps above has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in applications such as management of communications to and amongst multiple subscribers in a vicinity of a wireless access point to track social networks, provide advertisements to subscribers, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations, elements, aspects, etc.) of the invention(s), the reader is directed to the textual Detailed Description section and corresponding figures of the present disclosure as further discussed below. Thus, the following Detailed Description, in addition to providing an intricate description of details of the invention, also provides a further summary of aspects of the invention or inventions.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with one embodiment as discussed above, a network management application creates one or more maps, each of which represents a social network of participants that currently reside, participant that plan to reside, and/or participants that previously resided in a region of wireless coverage provided by a wireless access point. The network management application updates each map to reflect changes in a corresponding social network in accordance with movement of the participants in and out of the region of wireless coverage.

For example, if a subscriber moves outside the region of wireless coverage, the respective subscriber can be removed from the social network. If the subscriber moves into the region of wireless coverage, the respective subscriber can be added to the social network. Inclusion of a subscriber in a social network can depend on one or more factors or attributes such as whether a particular subscriber is a member of a particular organization. The wireless base station initiates transmission of communications to the participants of the social network in accordance with one or more rules.

Figure 1:
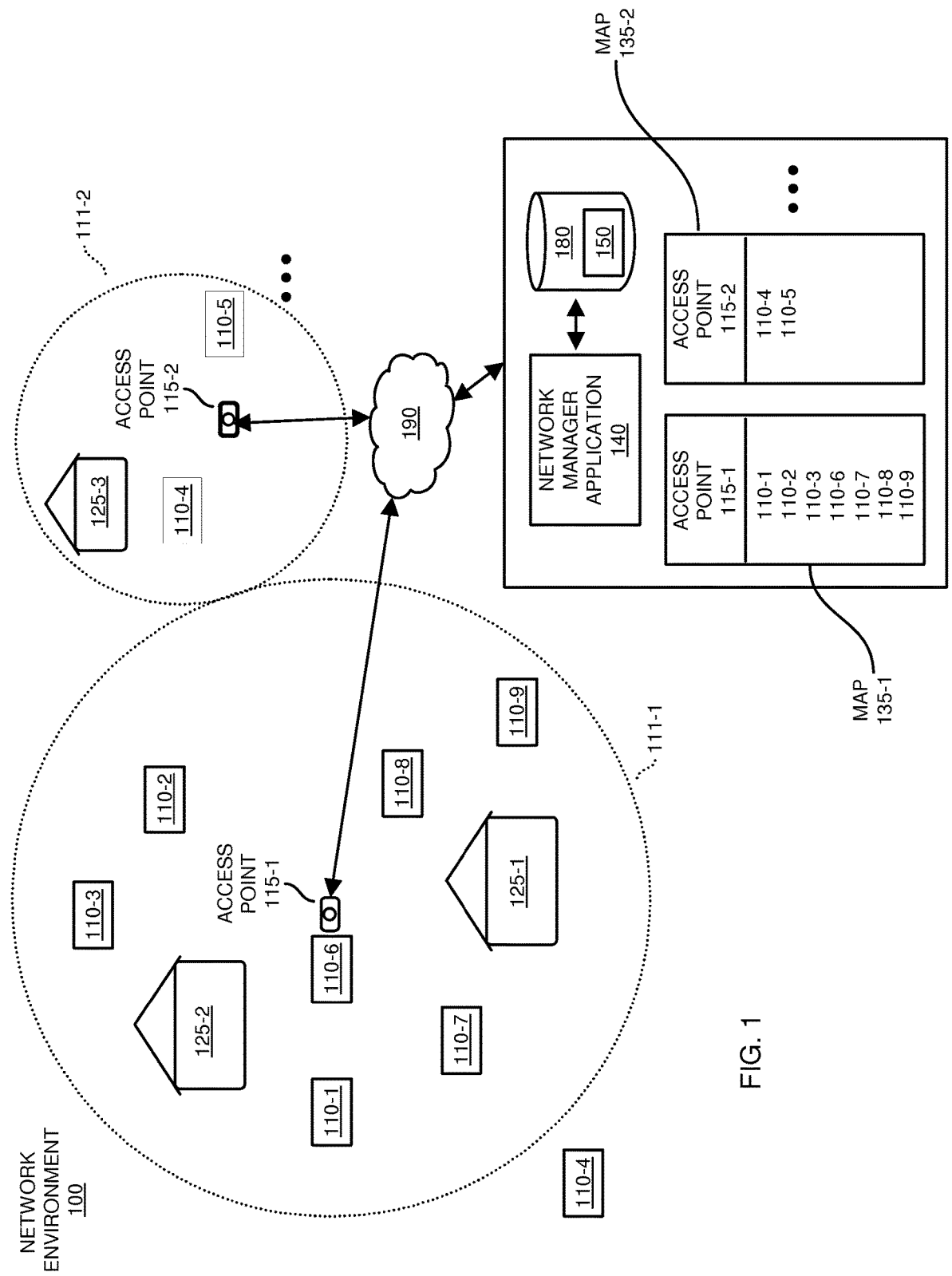
FIG. 1 is an example diagram of a communication system configured to keep track of subscribers in one or more regions of wireless coverage according to embodiments herein.

More specifically, FIG. 1 is an example diagram of a network environment according to embodiments herein.

As shown, network environment 100 includes one or more access points 115 (e.g., access point 115-1, access point 115-2, . . . ), a network 190, and a network management application 140, etc. Network 190 can include any suitable types of resources such as routers, servers, fiber links, wireless links, etc., to convey data. The data can be encoded as data packets transmitted in accordance with any suitable protocol.

In one embodiment, each of the access points 115 in network environment 100 supports two-way communications with resources in a respective wireless coverage region. For example, access point 115-1 supports a corresponding wireless coverage 111-1 to subscribers therein. In one direction, access point 115-1 communicates one or more messages over respective wireless links to the mobile devices 110 within the wireless coverage region 111-1. In a reverse direction, access point 115-1 receives messages transmitted over the wireless links from the mobile devices 110 within the wireless coverage region 111-1.

Each access point 115 in network environment 100 can be configured to operate in a similar manner to provide communications to mobile devices residing within a respective region of wireless coverage. For example, access point 115-2 supports wireless coverage region 111-2, and so on.

As mentioned, the access points 115 can communicate with subscribers via one or more RF (Radio Frequency) protocols. In one embodiment, the access points 115 support wireless connectivity with the subscribers via any suitable RF protocol such as WiFi, 802.11, cell phone protocol, etc.

Each respective access point 115 can include electronics to facilitate communications between the mobile devices in a wireless coverage region and a resource such as a physical cable (e.g., a coaxial cable) in communication with network 190. The access point can be physically attached to any mounting such as a coaxial cable, utility pole, etc.

Via a combination of a wireless link between a respective subscriber and the access point and a link (e.g., a hardwired or wireless link) between an access point and network 190, the subscribers of mobile devices 110 are able to communicate with resources in network 190.

During operation, the mobile devices 110 (e.g., mobile device 110-1, mobile device 110-2, mobile device 110-3, mobile device 110-4, mobile device 110-5, mobile device 110-6, mobile device 110-7, mobile device 110-8, mobile device 110-9, etc.) roam in and out of different coverage regions provided by the access points 115.

In one embodiment, network environment 100 includes network management application 140. The network management application 140 can reside at any of one or more suitable locations in the wireless network. For example, a network management application 140 can reside in a respective access point 115; the network management application 140 can reside in one or more servers in network environment 100; and so on. Embodiments herein can also require client SW (e.g. an application) executing on respective one or more mobile devices to utilize service specific functions.

As mentioned, one or more resources residing at a single location in the network environment 100 may provide the functionality associated with the network management application 140. As an alternative, one or more resources residing at different locations in the network environment 100 may provide the functionality associated with the network management application 140.

In one embodiment, the network management application 140 keeps track of the different mobile devices 110 (and hence respective subscribers) that are currently within a respective coverage region 111.

As an example, assume that the network management application 140 receives a message that is initially transmitted over a wireless link from a subscriber operating mobile device 110-1 to wireless access point 115-1. The network management application 140 can receive the message generated by the subscriber based on a subscriber of the mobile device 110-1 roaming within the wireless coverage region 111-1 and transmitting a communication to or through the access point 115-1.

As previously mentioned, the wireless access point 115-1 provides wireless connectivity between a set of multiple subscribers in the wireless coverage region 111-1 and a core network 190. A subscriber of the mobile device 110-1 can initiate communications with the access point 115-1 when it resides within the wireless coverage region 111-1.

In one embodiment, the access point and/or network management application 140 analyzes messages standard traffic messages (e.g., signals) received from the mobile devices 110 to identify the different subscribers that reside in the wireless coverage region at any given time. In one embodiment, no location-specific data in data packets is needed to determine the access point association because the mere transmission of data by the subscriber to an access point indicates that the subscriber is in a wireless coverage region.

In this example embodiment, based on an event such as detecting that the mobile device 110-1 resides within the wireless coverage region 111-1, the network management application 140 populates a map 135-1 to indicate that the subscriber operating mobile device 110-1 resides in the wireless coverage region 111-1.

Each time a new subscriber is detected based on communications, the network management application 140 updates a respective map 135 of current members. In this example embodiment, map 135-1 includes information indicating the different mobile devices (and respective subscribers) that currently reside within the wireless coverage region 111-1 supported by access point 115-1; map 135-2 includes information indicating the different mobile devices (and respective subscribers) that currently reside within the wireless coverage region 111-2 supported by access point 115-2; and so on.

In further embodiments, in response to detecting presence of the mobile device 110-1 and respective subscriber within the wireless coverage region 111-1, the network management application 140 initiates transmission of a communication from the wireless access point 115-1 to the mobile device 110-1. The communication can include advertisement information indicating presence of one or more business entities (e.g., business entity 125-1, business entity 125-2, etc.) that reside within boundaries of the wireless coverage region 111-1. Accordingly, the subscriber operating mobile device 110-1 can receive targeted communications based on merely residing (and/or potentially operating the mobile device 110-1) in the wireless coverage region 111-1 supported by access point 115-1.

In accordance with another embodiment, one or more messages from an application executing on a respective mobile device can include a query requesting information about presence of a particular type of business entity residing within boundaries of the wireless coverage range. For example, a subscriber operating mobile device 110-6 may generate and transmit a request for information about fast food restaurants located in or near the wireless coverage region 111-1. A server receiving the request can generate and transmit an answer to the query based on knowing that the subscriber is currently located in the wireless coverage region 111-1.

For example, the server can access information stored in a repository 180 or other suitable resource to generate the answer. In one embodiment, the repository 180 stores information of the different entities located within each respective wireless coverage region. The server accesses the information associated with the wireless coverage region 111-1 and businesses therein to generate an answer to the subscriber's query. Thus, the answer transmitted to the subscriber in response to the query can include information about at least one business entity in the wireless coverage region that is of the particular type (e.g., fast food restaurants).

Accordingly, network management application 140 can keep track of the presence of a social network of different subscribers and/or mobile devices 110 within a particular wireless coverage region and transmit area-specific information to the subscribers.

In accordance with further embodiments, based on access to historical records 150 in repository 180, the network management application 140 can be configured to detect that a respective subscriber (e.g., operate mobile device 110-1) previously conducted business with a business entity 125-1 residing within boundaries of the wireless coverage region 111-1. In response to detecting a condition such as that the subscriber that currently resides in the wireless coverage region 111-1 and that the subscriber previously conducted business with or visited the business entity 125-2 in the past, the network management application 140 can be configured to initiate transmission of a communication from the wireless access point 115-1 to the mobile device 110-1 to notify the subscriber of the presence of the business entity. The historical records 150 may include details of the subscriber's previous one or more visits to the business entity. The notification to the subscriber may even indicate to the subscriber of the previous visit and/or its purpose.

Embodiments herein can include keeping track of the communications previously transmitted to a respective subscriber. Additionally, the business entities and/or other resources can keep track of the effectiveness of sending the targeted advertisement. For example, if a subscriber receives a message that a nearby book store is having a sale, and it is known that the subscriber made a purchase at the book store (or at least visited the book store), the network management application 140 can be configured to store information indicating that the subscriber likes to read books. One way to track this is to issue location-specific coupons/advertisements. When a subscriber redeems a location-specific coupon, the system can establish and record a business relationship between a respective business and the party redeeming the location-specific coupon.

The network management application may deduce that the subscriber would be interested in book reading coffee shops in a nearby location and transmit such information to the subscriber in the future when it is detected that the subscriber is in a vicinity of a coffee shop. Accordingly, embodiments herein can include learning and storing attributes of a subscriber over time and transmitting targeted communications to the subscriber depending on the learned attributes and effectiveness of previously transmitted advertisements messages.

In accordance with further embodiments, the network management application 140 or other resource can be configured to access a set of area-specific advertisement messages stored in repository 180. The area-specific advertisement messages can include information associated with business entities (e.g., business entity 125-3, . . . ) that reside outside the wireless coverage region in which the subscriber resides or business entities (e.g., business entity 125-1, business entity 125-2, . . . ) that reside within boundaries of the wireless coverage region 111-1 in which the subscriber resides. The network management application 140 selectively transmits the area-specific advertisement messages to the multiple subscribers (and mobile devices 110) residing within boundaries of the wireless coverage region 111-1.

As previously mentioned, the area-specific advertisement information can be transmitted in a number of different ways. For example, the area-specific advertisement information can be automatically transmitted to a respective mobile device in response to detecting mere presence of the subscriber in a monitored region (e.g., wireless coverage region 111-1. Alternatively, the network management application 140 can be configured to transmit appropriate area-specific advertisement information to a mobile device in response to receiving a query from the respective subscriber.

In accordance with further embodiments, the network management application 140 populates the map 135-1 to indicate that both mobile device 110-1 (and a respective subscriber) and a second mobile device 110-2 (and respective subscriber) simultaneously reside within boundaries of the wireless coverage region 111-1 of the wireless access point 115-1.

The network management application 140 can be configured to identify whether there is a previously existing social association (e.g., an association other than being present in the same wireless coverage region) between the subscriber of mobile device 110-1 and the subscriber of mobile device 110-2. To identify whether the subscribers are socially related in one way or another, the network management application 140 can be configured to access personal records associated with each of the subscribers.

In one embodiment, in response to detecting that a social association exists between the subscriber of mobile device 110-1 and the subscriber of mobile device 110-2, the network management application 140 initiates transmission of a message from the wireless access point 115-1 to the subscriber operating the mobile device 110-1. The communication from the access point 115-1 to the mobile device 110-1 can indicate whether the subscriber of mobile device 110-2 is also currently within the boundaries of the wireless coverage region 111-1 or a nearby wireless coverage region of another access point.

Subsequent to the notification, the subscriber of the mobile device 110-1 can initiate transmission of a notification to the subscriber of the mobile device 110-2. In such an embodiment, the access point 115-1 can receive the notification transmitted from the subscriber of mobile device 110-1 to the subscriber of mobile device 110-2. The access point 115-1 forwards the notification to the subscriber of mobile device 110-2. Accordingly, members in a social network (including the subscriber operating the mobile device 110-1 and the subscriber operating the mobile device 110-2) can be notified of each other's presence in the wireless coverage region 111-1 and potentially communicate with each other.

In accordance with further embodiments, based on keeping track of the different subscribers in each of the different wireless coverage regions 111, the subscribers can be notified of the presence of subscribers located in nearby regions as well. For example, the network management application 140 and/or other resource in network environment 110 can be configured to identify a social relationship between a subscriber of mobile device 110-3 (residing in wireless coverage region 111-1) and a subscriber of mobile device 110-4 (residing in wireless coverage region 111-2).

The wireless coverage region 111-2 and the wireless coverage region 111-1 may be situated relatively close to each other in network environment 100. In response to detecting that a pre-existing social relationship exists between the subscriber of mobile device 110-3 and the subscriber of mobile device 110-4, the network management application 140 can be configured to provide notification to one or both of such subscribers that a friend, acquaintance, etc., is located nearby in a different wireless coverage region.

In accordance with another example embodiment, the subscribers may not be part of a previously existing social network. In this example case, a subscriber operating mobile device 110-1 in wireless coverage region 111-1 may have just visited a local venue (e.g., business entity 125-1) in wireless coverage region 111-1. The subscriber operating mobile device 110-1 can communicate with access point 115-1 to post a review of business entity 125-1 within the wireless coverage region 111-1. The review can be submitted to a publicly accessible forum.

In this instance, a message transmitted from the mobile device 110-1 to the access point 115-1 can include review information pertaining to a business resource residing within boundaries of the wireless coverage region. As previously mentioned, the network management application 140 or other resource can be configured to access the information in map 135 to identify at least one other subscriber also residing in the wireless coverage region 111-1. In one embodiment, the network management application 140 or other resource in network environment 100 initiates distribution of the review information received from the subscriber operating mobile device 110-1 to at least one other subscriber in the map 135-1. Embodiments herein can further include storing and then distributing the review information to future subscribers that roam into the wireless coverage region.

In accordance with another example embodiment, assume that a subscriber of mobile device 110-1 transmits a message over a wireless link from the subscriber to the wireless access point 115-1; the message can include review of an event occurring within boundaries of the wireless coverage region. In this instance, the network management application 140 or other resource in network environment 100 accesses the map 135-1 to identify at least one other mobile device and subscriber currently in the wireless coverage region 111-1 and initiates distribution of the review information to one or more other subscribers as specified by the map 135-1. Accordingly, the other subscribers operating mobile devices 110 residing in the wireless coverage region 110-1 can be apprised of good or bad experiences with businesses, current events, etc., that occur in when in a particular wireless coverage region.

Figure 2:
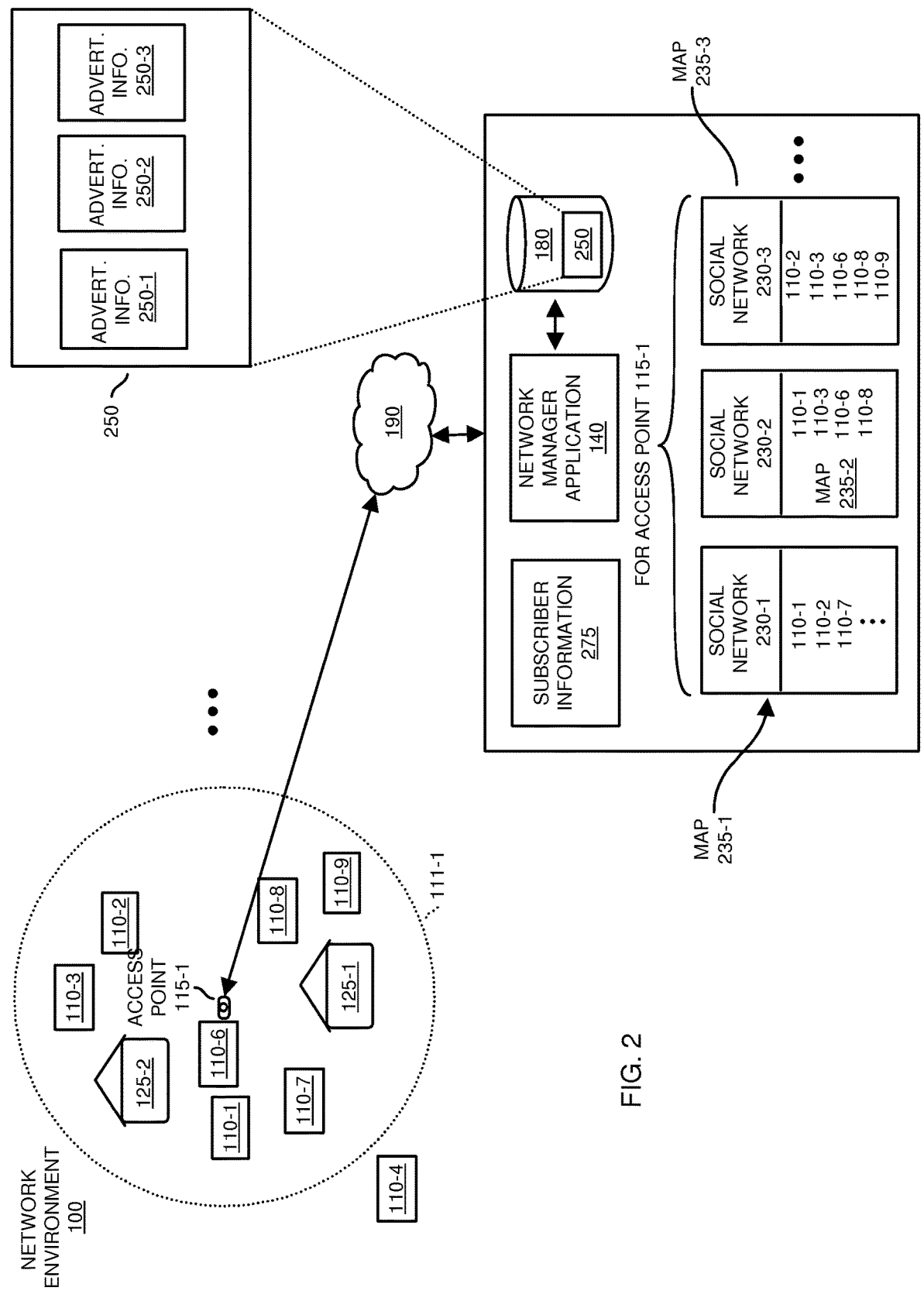
FIG. 2 is an example diagram illustrating a communication that tracks multiple social networks according to embodiments herein.

FIG. 2 is an example diagram illustrating a technique of tracking subscribers in one or more different social networks in a wireless coverage region and distribution of area-specific messages to members in the different social networks according to embodiments herein.

In accordance with further embodiments, note that for a region of wireless coverage provided by a respective wireless access point, the network management application 140 can be configured to keep track of multiple dynamic social networks in each wireless coverage region.

More specifically, the network management application 140 can add subscribers to a particular social network (or map) in a given coverage region depending on attributes of the subscriber using the access point. As an example, a first map 235-1 of maps 235 can be used to keep track of subscribers in the wireless region that share a first common attribute (e.g., persons that are friends in a social network on the Internet); a second map 235-2 of maps 235 can be used to keep track of subscribers in the wireless region that share a second common attribute (e.g., persons that purchase items from the retail business in the wireless region); a third map 235-3 of maps 235 can be used to keep track of subscribers in the wireless region that share a third common attribute (e.g., persons that belong to the same sports organization or fitness center); and so on. Thus, as mentioned, a newly present subscriber in the region of wireless coverage may be included in one or more of the social networks depending on their attributes.

As previously discussed, the network management application 140 and/or other resource such as access point 115-1 monitors the wireless coverage region 111-1 for actively communicating mobile devices 110. Upon detection of a particular subscriber operating a mobile device 110 in wireless coverage region 111-1, the network management application 140 can determines which if any of the different social networks 230 to which the subscriber belongs. For example, the network management application can receive an indication that mobile device 110-1 resides in wireless coverage region 111-1. Subscriber information 275 can include personal information indicating one or more different attributes of the subscribers or the social networks to which the subscribers belong. The network management application 140 can access subscriber information 275 associated with the subscriber of mobile device 110-1 to determine which of one or more social networks a subscriber or mobile device belongs. In one embodiment, the subscriber information 275 indicates attributes such as different clubs, organizations, etc., to which each subscriber belongs.

In response to detecting that the subscriber operating mobile device 110-1 in wireless coverage region 111-1 is present in a particular wireless coverage region and belongs to both social network 230-1 and social network 230-2, the network management application 140 adds the identity of mobile device 110-1 and/or corresponding subscriber to the map 235-1 and 235-2. In response to detecting that the subscriber operating mobile device 110-2 is present in wireless coverage region 111-1 and belongs to social network 230-1 and social network 230-3, the network management application 140 adds the identity of mobile device 110-2 and/or corresponding subscriber to the map 235-1 and 235-3. In response to detecting that the subscriber operating mobile device 110-3 is present in wireless coverage region 111-1 and belongs to social network 230-2 and social network 230-3, the network management application 140 adds the identity of mobile device 110-3 and/or corresponding subscriber to the map 235-1 and 235-2, and so on. Thus, in this way, the different subscribers can be added to currently active social networks 230 as tracked by maps 235.

In one embodiment, the network management application 140 updates each of the maps 235 to reflect changes in the social networks 230 in accordance with movement of the participants in and out of the wireless coverage region 111-1 (i.e., region of wireless coverage). For example, in response to detecting an event such as that the mobile device 110-1 moves out of the wireless coverage region 111-1 or that the mobile device terminates a respective communication link with the access point 115-1, the network management application 140 removes the identity of the mobile device 110-1 and/or respective subscriber from the maps 235-1 and 235-2. In this way, the maps 235 keep track of multiple different social networks of persons/mobile devices currently residing in wireless coverage region 111-1.

In accordance with further embodiments, the network management application 140 and/or access point can initiate communications with the participants of each of the different social networks as specified by the maps 235.

Assume in this example that the network management application populates the map 235 to indicate that a first subscriber (e.g., mobile device 110-1) and a second subscriber (e.g., mobile device 110-2) are members of the social network 230-1 and simultaneously reside within the region of wireless coverage of the access point 115-1 (i.e., base station). Based on inclusion in a same social network, the network management application 140 identifies that there is a social association between the first subscriber operating mobile device 110-1 and the second subscriber operating mobile device 110-2. The social association indicates or mere inclusion in a map can indicate that the first subscriber and second subscriber are members of a common organization, club, on-line chat club, dating club, sports club, etc.

In one embodiment, the members of a social network can control whether they are open to receiving communications from other club members. Assume that the subscriber operating mobile device 110-1 and subscriber operating mobile device 110-2 are both amenable to dissemination of information indicating that they are present in a wireless coverage region 111-1. In such an embodiment, the network management application 140 can be configured to transmit a message from the access point 115-1 to the subscriber operating mobile device 110-1. The message can indicate that the subscriber operating mobile device 115-2 is currently in the wireless coverage region 111-1. In response to receiving the notification, the subscriber operating mobile device 110-1 can transmit a message to the subscriber operating mobile device 110-2 by way of the network management application 140. The access point 115-1 forwards the message to the subscriber operating mobile device 110-2. Accordingly, in addition to keeping track of the different social networks and corresponding members located in a wireless coverage region, the network management application 140 can be configured to facilitate messaging between the participants in a respective wireless coverage region.

In certain cases, an access point may provide a relatively small area of coverage such as more or less than a 100-foot diameter region. Embodiments herein can be expanded to keep track of and provide notification when members of the same social network are in a group of wireless coverage regions in addition to being in the same wireless coverage region.

In accordance with further embodiments, the mobile devices 110 can be configured with a display screen enabling a respective to subscriber to view a list of other members in a respective social network that also reside within the same or nearby coverage region with respect to the subscriber. For example, as mentioned, the subscriber of mobile device 110-1 can belong to social network 230-1 and social network 230-2. In such an instance, the network management application 140 can be configured to notify the subscriber of mobile device 110-1 that subscribers associated with mobile devices 110-2, 110-7, etc., belong to the social network 230-1 and that these subscribers are currently also in a same or nearby wireless coverage region; the network management application 140 can be configured to notify the subscriber of mobile device 110-2 that subscribers associated with mobile devices 110-1, 110-7, etc., belong to the social network 230-1 and that such subscribers are currently also in a same or nearby wireless coverage region; and so on. The network management application 140 can notify the general whereabouts of the different wireless coverage regions to which the members in a social network belong so that the subscriber can visit the area to meet the other identified members.

In accordance with further embodiments, the network management application 140 can be configured to analyze attributes of a given participant that is present in the wireless coverage region 111-1 and map the attributes of the given subscriber to advertisement information pertinent to the given subscriber. By way of the access point 115-1, the network management application 140 transmits appropriate advertisement information to the given subscriber.

More specifically, as an example of targeting advertisement messages to subscribers, assume that the social network 230-1 includes members that enjoy playing sports. The network management application 140 can be configured to receive notification that the subscriber of mobile device 110-1 currently resides and communicates in wireless coverage region 111-1. As further mentioned, the network management application 140 can be configured to identify that the subscriber of mobile device 110-1 belongs to the social network 230-1 (e.g., sports club). In response to detecting that the subscriber of mobile device 110-1 is a member of the sports club, the network management application 140 uses a mapping between social network 230-1 and advertisement information 250 to identify that advertisement information 250-1 includes an advertisement of a fitness facility in the wireless coverage region 111-1 that may be of interest to the subscriber of mobile device 110-1 due to the association with the social network 230-1 (e.g., sports club). In this instance, the network management application rest and transmits the advertisement information 250-1 to the mobile device 110-1 for viewing by the subscriber.

In a similar manner, the network management application 140 can initiate transmission of the appropriate advertisement information 250-1 to each of the members in social network 230-1. In addition to targeting the advertisement that would be of interest to a subscriber, the advertisement can be area-specific to the extent that the advertisement pertains to an event, a building, etc., that is located in a vicinity of the wireless coverage region 111-1.

By way of further non-limiting example, assume that the social network 230-2 includes different subscribers that attend the same university. The advertisement information 250-2 associated with the social network 230-2 can include coupons to local restaurants that reside in the wireless coverage region 111-1 that may be of interest to the members in the social network 230-2. Subsequent to detecting presence of the subscribers operating mobile device 110-1, mobile device 110-3, mobile device 110-6, mobile device 110-8, etc., in the wireless coverage region 111-1, the network management application 140 can be configured to retrieve the advertisement information 250-2 and transmit it to one or more members in the list of subscribers in the social network 230-2.

In a similar manner as discussed above, the network management application 140 can be configured to distribute advertisement information 250-3 to subscribers that are members of social network 230-3.

In accordance with further embodiments, note that inclusion in the social networks 230 can depend on a particular type of application (e.g., software program, etc.) executed by a respective mobile device. The social network 230-1 can include subscribers in a respective wireless coverage region that operate a first type of application; the social network 230-2 can include subscribers in the respective wireless coverage region that operate a second type of application; the social network 230-3 can include subscribers in the respective wireless coverage region that operate a third type of application; and so on. Execution of the application of a particular type can cause the respective subscribers (and mobile devices) to create a link and connect to a particular server in network environment 100. By executing the same application and/or being connected to the same server via respective links, a group of subscribers operating the same application in a given wireless coverage region form a social network.

As mentioned above, the network management application 140 can be configured to detect a presence of different mobile devices 110 communicating in a respective wireless coverage region. Based on contents of the communications from the subscribers operating mobile devices 110, the network management application 140 can identify a particular type of one or more applications executing on each of the respective mobile devices. Based on the type of one or more applications executing on a respective mobile device, the network management application 140 can add the subscriber as a member to one or more of the multiple social networks 230.

As an example, via communications from each of the mobile device 110-1, mobile device 110-2, mobile device 110-7, etc., assume that the network management application 140 determines that each of the mobile devices executes an application to find restaurants in the local area. In a manner as discussed herein, the network management application 140 includes each of the mobile devices in this set to the map 235-1 since the subscribers are executing the same application and are part of the social network 230-1.

Via communications from each of the mobile device 110-1, mobile device 110-3, mobile device 110-6, mobile device 110-8, etc., assume that the network management application 140 determines that each of the mobile devices executes an application typically executed by students attending the same university. The network management application 140 includes each of the mobile devices in this set to the map 235-2 since the subscribers execute the same application.

As previously discussed, the network management application 140 can support functionality such as enabling communications amongst members of the same social network, transmission of targeted advertisement messages to the members of a respective social network, etc.

As previously discussed, the functionality provided by network management application 140 can be distributed to multiple resource in network environment 100. For example, a first resource (or set of resources) in network environment 100 can be configured to keep track of the different subscribers in the wireless coverage regions. A third party operating a second resource (or set of resources) in network environment 100 can be configured to store the subscriber information 275 and advertisement information 250. The third party has access to the information (e.g., information of which subscribers reside in the different wireless coverage regions) tracked by the first resource. The third party operates the second resource(s) and identifies which advertisement information, messages, etc., to send to the different subscribers.

Figure 3:
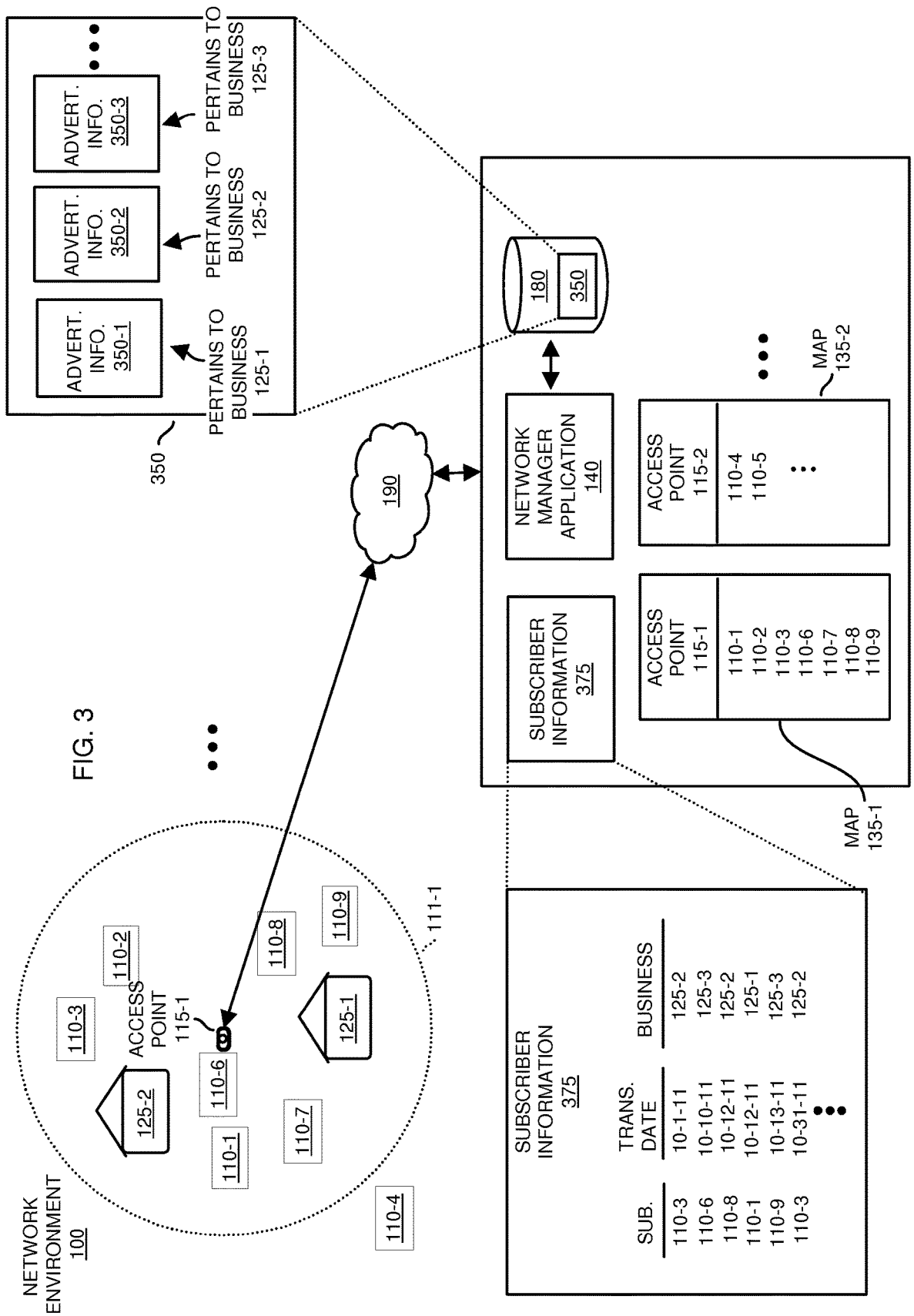
FIG. 3 is an example diagram illustrating management and distribution of advertisement information in a network according to embodiments herein.

FIG. 3 is an example diagram illustrating distribution of messages according to embodiments herein.

As previously discussed, the network management application 140 can keep track of a list of subscribers that are present in each of the respective wireless coverage regions. The maps 135 can indicate members that form a respective social network in a given wireless coverage region. For example, map 135-1 defines a list of members in wireless coverage region 111-1 that form a first social network; map 135-2 defines a list of members in wireless coverage region 111-2 that form a second social network; and so on.

According to one embodiment, the network management application 140 receives advertisement information 350 for one or more venues within or near a respective wireless coverage region of a wireless access point. For example, the network management application 140 receives advertisement information 350-1 pertaining to business entity 125-1 in wireless coverage region 111-1; the network management application 140 receives advertisement information 350-2 pertaining to business entity 125-2 in wireless coverage region 111-1; the network management application 140 receives advertisement information 350-3 pertaining to business entity 125-3 in wireless coverage region 111-3; and so on. The network management application 140 has access to advertisement information for each of multiple different wireless coverage regions.

In accordance with one embodiment, the network management application 140 associates the advertisement information 350 to a specific group of one or more wireless access points. For example, in one example embodiment, the network management application 140 associates the advertisement information 350-1 and advertisement information 350-2 to access point 115-1; the network management application 140 associates the advertisement information 350-3 to access point 115-2; and so on.

As previously discussed, the network management application 140 can also populate maps 135 to indicate the different subscribers that currently reside within a respective wireless coverage region. In this example as shown in FIG. 3, map 135-1 indicates that mobile device 110-1, mobile device 110-2, mobile device 110-3, mobile device 110-6, mobile device 110-7, mobile device 110-8, mobile device 110-9, etc., reside within wireless coverage region 111-1; map 135-2 indicates that mobile device 110-4, mobile device 110-5, etc., reside within wireless coverage region 111-2; and so on.

In response to a condition such as detecting that the subscribers in map 135-1 currently reside within the wireless coverage region 111-1, the access point 115-1 initiates transmission of one or more advertisement communications (e.g., including advertisement information 350-1, advertisement information 350-2, etc.) to the subscribers in the wireless coverage region 111-1. Also, these advertisements can be initiated from an appropriate access point to each respective subscriber in response to detecting that the respective subscriber roams into the coverage region.

Thus, in accordance with one embodiment, the access point 115-1 can be configured to detect presence of subscribers in a wireless coverage region and transmit targeted advertisement communications to the subscribers. The advertisement information 350-1 can be used to notify a recipient subscriber of: i) a location of the business entity 125-1 in the wireless coverage region 111-1, ii) promotional sales events associated with the business entity 125-1, and so on. The advertisement information 350-2 can be used to notify a recipient subscriber of a location of the business entity 125-2 in the wireless coverage region 111-1, promotional sales events associated with the business entity 125-2, and so on.

In response to a condition such as detecting that the subscribers in map 135-2 currently reside within the wireless coverage region 111-2, the access point 115-2 initiates transmission of one or more advertisement communications (e.g., including advertisement information 350-3, etc.) to the subscribers in the wireless coverage region 111-2. Thus, in accordance with one embodiment, the access point 115-2 can be configured to detect presence of subscribers in a wireless coverage region and transmit targeted advertisement communications to such subscribers. The advertisement information 350-1 can be used to notify a recipient subscriber of a venue such as a location of the business entity 125-3 in the wireless coverage region 111-1, promotional sales events associated with the business entity 125-3, and so on.

Note further that the advertisement information can be associated with multiple access points and multiple wireless coverage regions. In such an instance, the access points 115 can be configured to transmit advertisement information to subscribers in multiple wireless coverage regions. For example, the access point 115-1 can be configured to transmit a message including advertisement information 350-3 to mobile devices 110 in the wireless coverage region 111-1 even though the business entity 125-3 (to which the advertisement information 350-3 pertains) resides in wireless coverage region 111-2 (a neighbor to wireless coverage 111-1). Accordingly, subscribers operating mobile devices in one wireless coverage region can be notified of businesses, events, etc., in nearby wireless coverage regions.

In a similar manner, the access point 115-2 can be configured to transmit messages including advertisement information 350-1 to mobile devices 110 in the wireless coverage region 111-2 even though the business entity 125-1 (to which the advertisement information 350-1 pertains) resides in wireless coverage region 111-1 (a neighbor to wireless coverage 111-2).

Accordingly, advertisement information 350 can be assigned to multiple different access points for distribution in multiple wireless coverage regions.

Transmission of advertisement communications can occur in response to any type of event. For example, the access point 115-1 can transmit advertisement information to subscribers in the wireless coverage region 111-1 in response to detecting that a mobile subscriber operating a respective mobile device performs some action (e.g., a purchase of an item) within the wireless coverage region 111-1.

The advertisement information can indicate a venue such as an event scheduled to take place within boundaries of a respective wireless coverage region. The communication distributed by a wireless access point includes details such as a location, time, etc., of the event.

In accordance with further embodiments, the advertisement information 350 can be transmitted to a particular subscriber operating a mobile device depending on a past history of business transactions between the business entity (in or near a wireless coverage region) and a respective subscriber. As an example, the network management application 140 can be provided access to subscriber information 375. The subscriber information 375 can include data indicating that subscriber operating mobile device 110-3 conducted business with business entity 125-2 on Oct. 1, 2010; the subscriber information 375 indicates that subscriber operating mobile device 110-6 conducted business with business entity 125-3 on Oct. 10, 2010; the subscriber information 375 indicates that subscriber operating mobile device 110-8 conducted business with business entity 125-2 on Oct. 12, 2010; and so on. The transaction with the business can be any suitable event such as purchase of an item, visiting the store, posting of a review, etc.

In one embodiment, the access point 115-1 detects presence of the subscriber of mobile device 110-3 in wireless coverage region 111-1. The network management application 140 identifies attributes of the subscriber operating the mobile device 110-3. The network management application 140 maps the attributes of the mobile subscriber of mobile device 110-3 to a portion of the advertisement information 350 pertinent to the mobile subscriber. For example, advertisement information 350-2 includes information promoting business entity 125-2. In one embodiment, the in response to detecting that the subscriber of mobile device 110-3 previously conducted business with business entity 125-2 on Oct. 1, 2011, the wireless access point 115-1 transmits advertisement information 350-2 (e.g., pertaining to business entity 350-1) to the subscriber operating mobile device 110-3.

In this way, the network management application 140 can be configured to identify pertinent advertisement messages in which to transmit to one or more members in a social network. More specifically, the network management application 140 and/or the one or more access points can be configured to transmit a communication from the access point to a given participant of the social network in response to detecting that the given participant previously conducted business with a business entity residing in a same or nearby region of wireless coverage. As mentioned, the communication can be an advertisement associated with a business entity in a current location in which the subscriber resides or a nearby wireless coverage region in which the subscriber does not currently reside.

In accordance with further embodiments, and consistent with other embodiments as discussed herein, the network management application 140 can be configured to populate a map 135-1 to indicate that a first subscriber operating mobile device 110-1 and a second subscriber operating mobile device 110-2 are participants of the social network (e.g., included in map 135-1) and simultaneously reside within the region of wireless coverage 111-1.

The network management application 140 can identify a social association between the subscriber operating mobile device 110-1 and the subscriber operating mobile device 110-2. For example, the two subscriber may belong to the same fitness center, the same sports club, same dating club, etc. The subscribers also may be socially associated with each other merely by residing within the same wireless coverage region 111-1. In response to detecting a condition such as that the subscriber of the mobile device 110-1 previously conducted business with a business entity 125-1 located in the wireless coverage region 111-1, and because there is a social association between the subscribers, the access point 115-1 transmits an advertisement (e.g., advertisement information 30-1) to the subscriber of mobile device 110-2 indicating presence of the business entity 125-1 in the wireless coverage region 111-1. Thus, a particular subscriber can be notified of businesses frequented by the friends of the particular subscriber.

In yet further embodiments, the network management application 140 can track historical movement of the subscribers and current movement of the subscribers through multiple wireless coverage regions. Based on a past history of a subscriber's movements in the wireless coverage regions, the network management application 140 can initiate transmission of pertinent advertisement information to the subscribers. For example, the network management application can initially detect that a particular subscriber operates a respective mobile device in a library environment as well as a coffee shop. In this example embodiment, the network management application 140 can be configured to conclude that the subscriber likes to read books and notifies, via pertinent advertisement information 350, the subscriber of the mobile device of a bookstore in a nearby wireless coverage region.

As another example, a subscriber operating a respective mobile device can execute one or more different applications on their mobile device. The application can support any type of functionality. As an example, assume that the subscriber operating mobile device 110-6 executes an application to find a retail business. In such an instance, the subscriber can generate a query about presence of a particular type of business entity (e.g., restaurants) residing within boundaries of an immediate or nearby wireless coverage region. In response to receiving the query, the access point can be configured to transmit a communication including appropriate restaurant advertisement information to the subscriber in response to receiving the query.

In accordance with another embodiment, the subscribers operating the respective mobile devices in a geographical region including one or more access points and wireless coverage regions can communicate with each other. For example, as mentioned, the subscriber operating mobile device 110-9 may post a message, review, chat, etc. The access point 115-1 initiates distribution of the posted message, review, etc., to any member in the geographical region of one or more wireless coverage regions. In one embodiment, the subscriber of mobile device 110-9 can indicate, via one or more messages from the access point 115-1, that a particular menu item was very good at a particular restaurant residing in the wireless coverage region 111-1. In response to receiving the message, the access point 115-1 can notify each of the other subscribers (or any subscribers amenable to receiving such messages) in the map 135-1 of the message posted by the subscriber operating mobile device 110-9. Additionally, messages also can be transmitted to future subscribers that roam into the wireless coverage region.

As previously discussed, the functionality provided by network management application 140 can be distributed to multiple resource in network environment 100. For example, a first resource (or first set of resources) in network environment 100 can be configured to keep track of the different subscribers in the wireless coverage regions. A third party operating a second resource (or second set of resources) in network environment 100 can be configured to store the subscriber information 275 and advertisement information 250. The third party has access to the information (e.g., information of which subscribers reside in the different wireless coverage regions) tracked by the first resource. The third party operates the second resource(s) and identifies which advertisement information, messages, etc., to send to the different subscribers.

Figure 4:
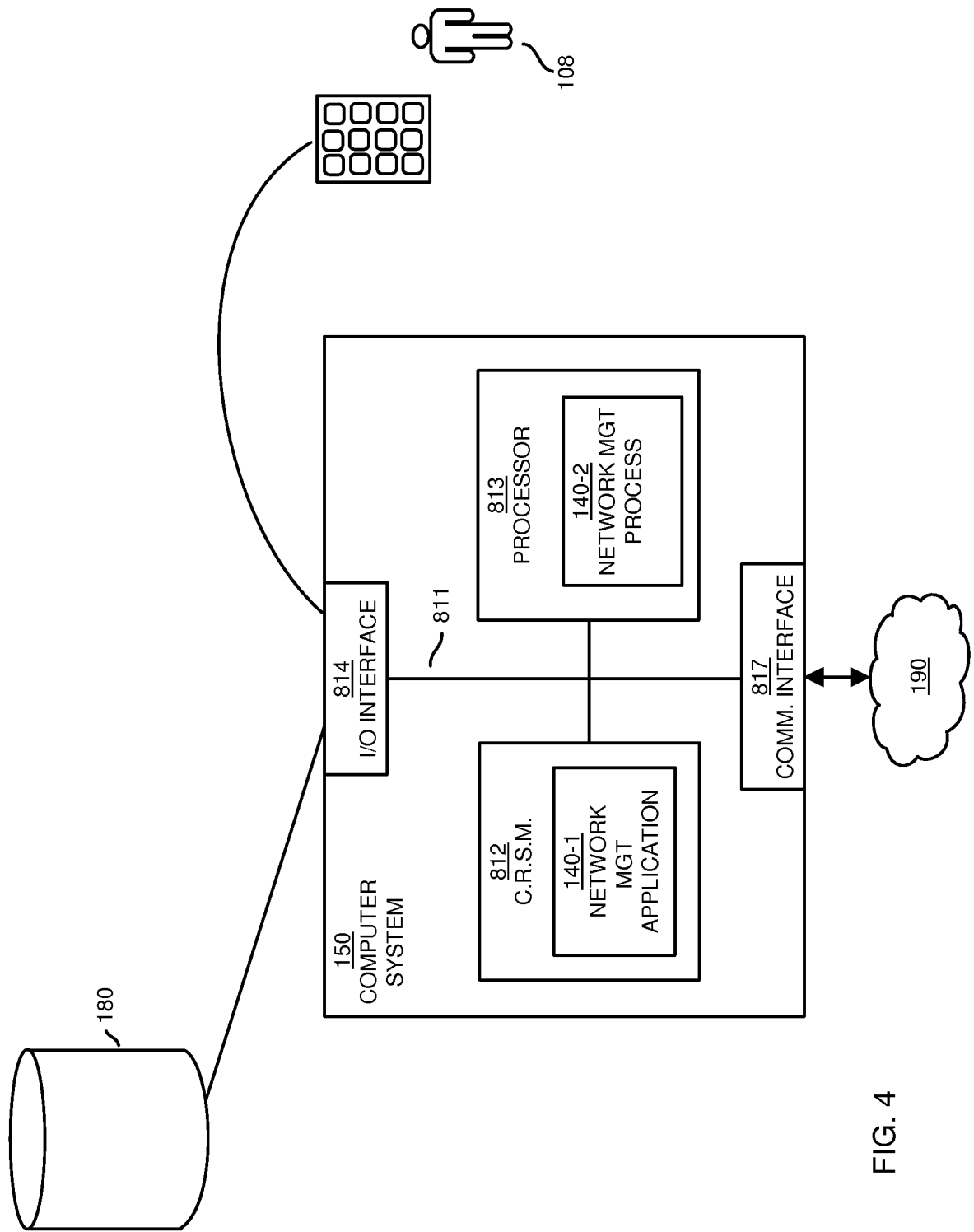
FIG. 4 is a diagram illustrating example hardware including a processor and an encoded hardware storage medium to execute according to embodiments herein.

FIG. 4 is an example block diagram of a computer system 150 for implementing any of the operations according to embodiments herein.

As shown, computer system 150 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as display screen, keypad, a computer mouse, etc.

Computer readable storage medium 812 can be any non-transitory storage device such as memory, optical storage, hard drive, floppy disk, etc. In one embodiment, the computer readable storage medium 812 stores instructions and/or data.

Communications interface 817 enables the computer system 800 and processor 813 to communicate over a resource such as network 190 to retrieve information from remote sources and communicate with other computers. Depending on the embodiment, any or all of the functionality associated with the network management application 140-1 can be performed locally by processor 813, or via resources in network 190, or a combination of both.

I/O interface 814 enables processor 813 to retrieve or attempt retrieval of stored information from repository 180.

As shown, computer readable storage media 812 is encoded with network management application 140-1 (e.g., software, firmware, etc.) executed by processor 813. Network management application 140-1 can be configured to include instructions to implement any of the operations associated with network management application 140 as previously discussed.

During operation of one embodiment, processor 813 accesses computer readable storage media 812 via the use of interconnect 811 in order to launch, run, execute, interpret or otherwise perform the instructions in network management application 140-1 stored on computer readable storage medium 812.

Execution of the network management application 140-1 produces processing functionality such as network management process 140-2 in processor 813. In other words, the network management process 140-2 associated with processor 813 represents one or more aspects of executing network management application 140-1 within or upon the processor 813 in the computer system 150.

Those skilled in the art will understand that the computer system 150 can include other processes and/or software and hardware components, such as an operating system that controls allocation and use of hardware resources to execute network management application 140-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 and/or functionality supported by the network management application may reside or be moved to any location in network environment 100.

Functionality supported by the network management application 140 will now be discussed via flowcharts in FIGS. 5-7. Note that the steps in the flowcharts below can be executed in any suitable order.

Figure 5:
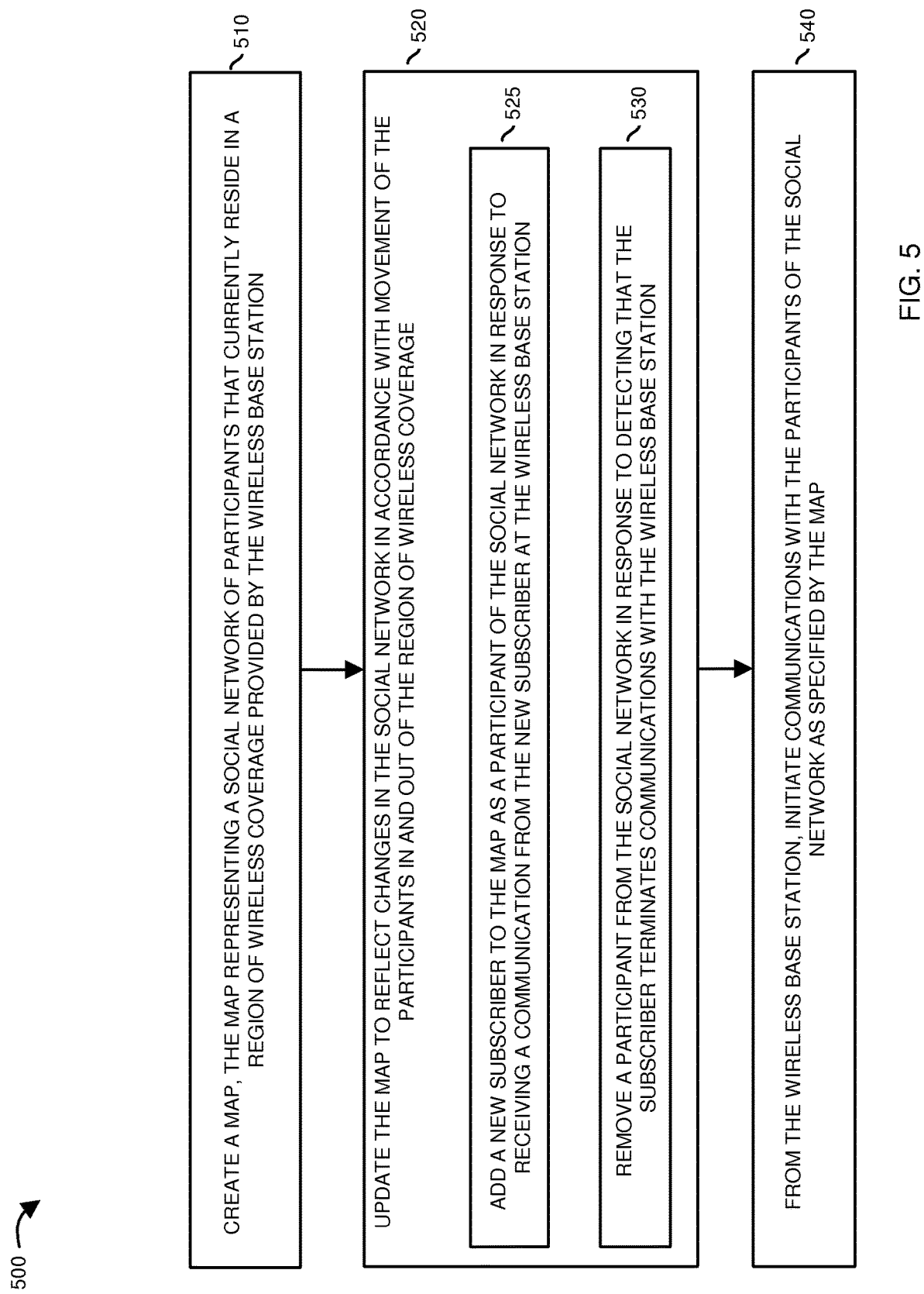
FIGS. 5-7 are flowcharts illustrating example methods according to embodiments herein.

FIG. 5 is a flowchart 500 illustrating an example method according to embodiments herein. Note that there will be some overlap with respect to concepts as discussed above.

In step 510, the network management application 140 creates a map 135-1. The map 135-1 represents a social network of participants (e.g., subscribers operating mobile devices 110) that currently reside in a wireless coverage region 111-1 provided by the wireless base station (e.g., access point).

In step 520, the network management application 140 updates the map 135-1 to reflect changes in the social network in accordance with movement of the participants in and out of the wireless coverage region 111-1.

In sub-step 525, the network management application 140 adds an identity of a new subscriber to the map 135-1 as a participant of the social network in response to receiving a communication from the new subscriber at the access point 115-1.

In sub-step 530, the network management application 140 removes a participant from the social network in response to detecting a condition such as that the subscriber terminates communications with the access point 115-1.

In step 540, the network management application 140 initiates communications, from the access point 115-1, with the participants of the social network as specified by the map 135-1.

Figure 6:
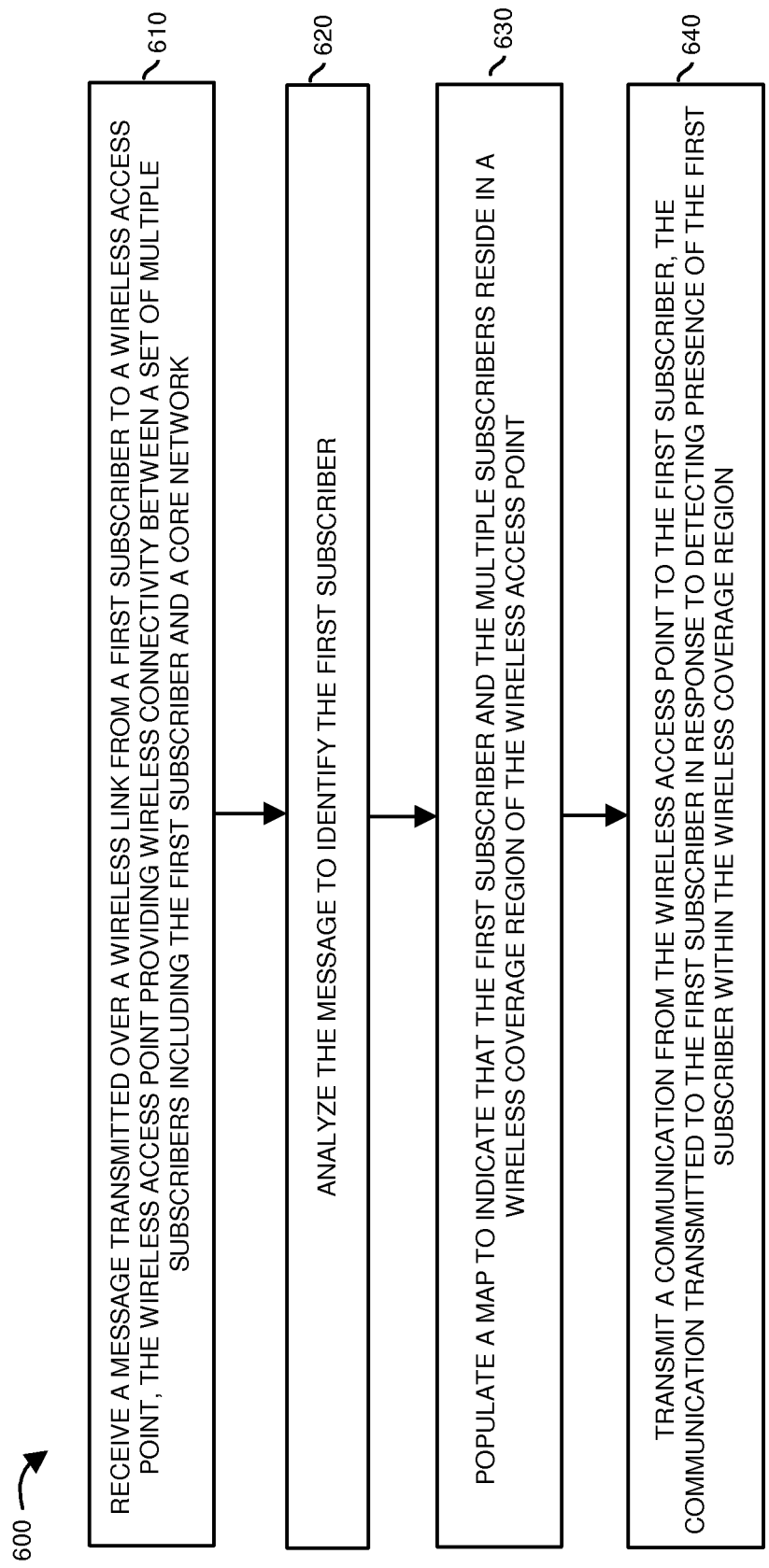

FIG. 6 is a flowchart 600 illustrating an example method according to embodiments herein. Note that there will be some overlap with respect to concepts as discussed above.

In step 610, the network management application 140 receives a message transmitted over a wireless link from a subscriber to a wireless access point 115-1. The wireless access point 115-1 provides wireless connectivity (e.g., one or more individual wireless links) between each member in a set of multiple subscribers (including the subscriber) and a core network such as network 190.

In step 620, the network management application 140 analyzes the message to identify the subscriber.

In step 630, the network management application 140 populates a map 135-1 to indicate that the identified subscriber currently resides in a wireless coverage region 111-1 of the wireless access point 115-1.

In step 640, the network management application 140 initiates transmission of a communication from the wireless access point 115-1 to the subscriber. The network management application initiates transmission of the communication to the subscriber in response to detecting presence of the subscriber within the wireless coverage region 111-1.

Figure 7:
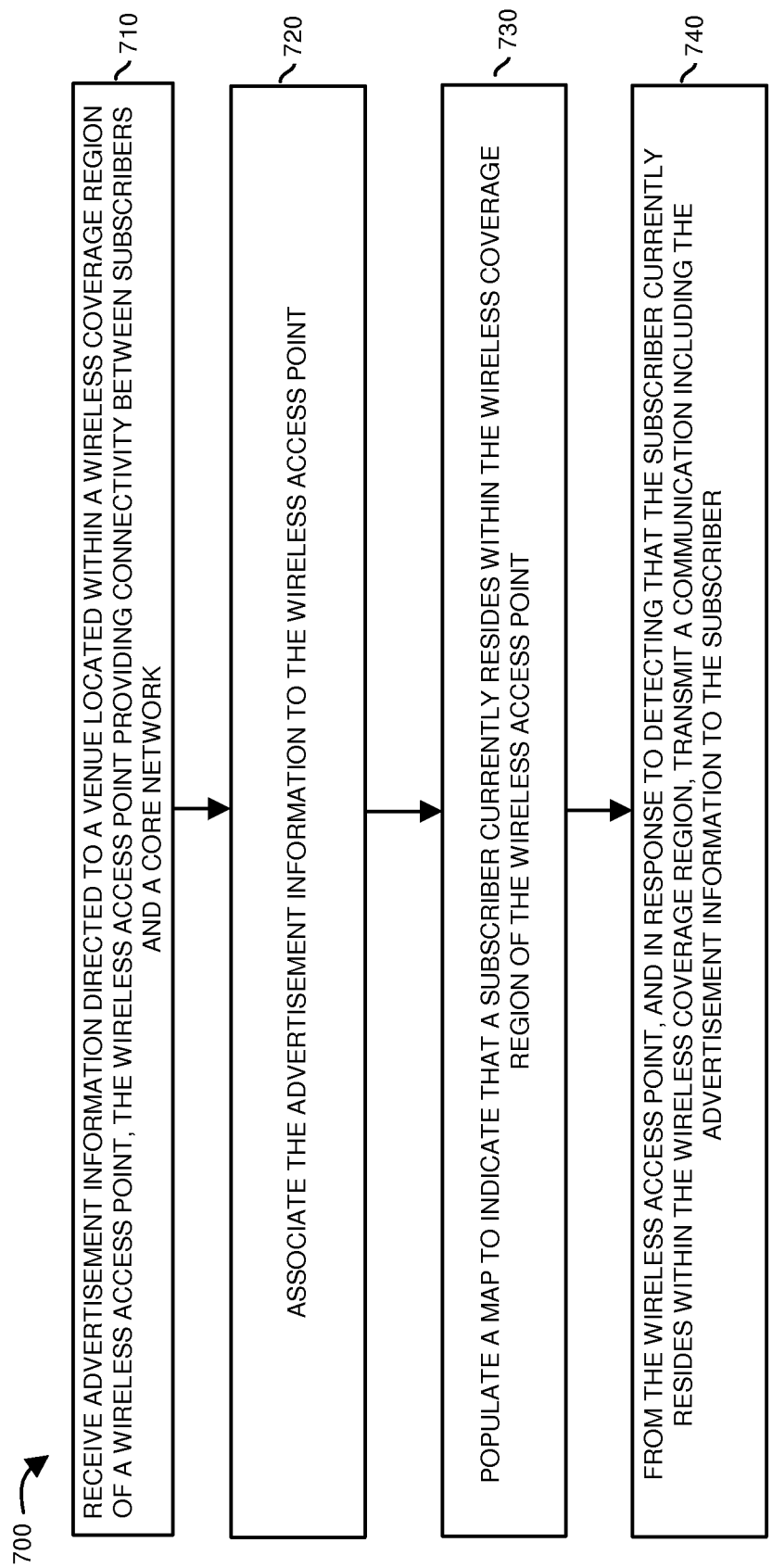

FIG. 7 is a flowchart 700 illustrating an example method according to embodiments herein. Note that there will be some overlap with respect to concepts as discussed above.

In step 710, the network management application 140 receives advertisement information 350-1 pertaining to a venue located within a wireless coverage region 111-1 of a wireless access point 115-1. The wireless access point 115-1 provides connectivity between subscribers and a core network such as network 190.

In step 720, the network management application 140 associates the advertisement information to the wireless access point.

In step 730, the network management application 140 populates a map to indicate that a subscriber currently resides within the wireless coverage region 111-1 of the wireless access point 115-1.

In step 740, from the wireless access point, and in response to detecting that the subscriber currently resides within the wireless coverage region, the network management application 140 initiates transmission of a communication including the advertisement information to the subscriber.

Note again that techniques herein are well suited for use in cellular type networks in which each respective base station provides connectivity to a core network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
using computer processor hardware, performing operations of:
creating a map, the map indicating a social network of participants operating respective mobile communication devices in wireless communication with a wireless base station operating in a network environment, inclusion in the map indicating that the social network of participants: i) currently reside in a region of wireless coverage provided by the wireless base station and ii) had a pre-existing social association with each other prior to being detected as being present in the region of wireless coverage provided by the wireless base station, the map indicating that each of the participants is currently in wireless communication with the wireless base station over a respective wireless communication link in the region of wireless coverage;
updating the map to reflect changes in the social network in accordance with movement of the participants in and out of the region of wireless coverage; and
from the wireless base station, initiating communications with the participants of the social network as specified by the map.

2. The method as in claim 1, wherein updating the map includes:
adding a new subscriber to the map as a participant of the social network in response to receiving a communication from the new subscriber at the wireless base station, the map indicating that the new subscriber resides within the region of wireless coverage and is currently in wireless communication with the wireless base station over a corresponding wireless communication link between a mobile device operated by the new subscriber and the wireless base station.

3. The method as in claim 1 further comprising:
removing an identity of a given participant from the social network in response to detecting that the given participant terminates a corresponding wireless communication link between a mobile device operated by the given participant and the wireless base station.

4. The method as in claim 1 further comprising:
populating the map to indicate that a first subscriber and a second subscriber reside in the region of wireless coverage provided by the wireless base station;
identifying a social association between the first subscriber and the second subscriber, the social association indicating that the first subscriber and second subscriber are members of a common organization; and
initiating transmission of a message from the wireless base station to the first subscriber, the communication indicating that the second subscriber is currently in the region of wireless coverage.

5. The method as in claim 4 further comprising:
at the wireless base station, receiving a notification transmitted from the first subscriber to the second subscriber; and
forwarding the notification from the wireless base station to the second subscriber.

6. The method as in claim 1 further comprising:
populating the map to indicate that a first subscriber and a second subscriber are participants of the social network and simultaneously reside within the region of wireless coverage;
identifying a social association between the first subscriber and the second subscriber; and
in response to detecting that the first subscriber previously conducted business with a business entity located in the region of wireless coverage and that the social association exists between the first subscriber and the second subscriber, transmitting an advertisement from the wireless base station to the second subscriber, the advertisement indicating presence of the business entity in the region of wireless coverage.

7. The method as in claim 1 further comprising:
creating the map to include an identity of a first participant in response to detecting that the first participant operates a first communication device that communicates over a first wireless link to the wireless base station; and
creating the map to include an identity of a second participant in response to detecting that the second participant operates a second communication device that communicates over a second wireless link to the wireless base station.

8. The method as in claim 7 further comprising:
removing the identity of the second participant from the map in response to detecting termination of the second wireless communication link.

9. The method as in claim 7 further comprising:
identifying a social association between the first participant and the second participant, the social association indicating that the first participant and the second participant are members of a common organization;
in response to detecting the social association, initiating transmission of a message from the wireless base station to the first participant, the communication indicating that the second participant is currently in the region of wireless coverage;
at the wireless base station, receiving a notification transmitted from the first participant to the second participant; and
forwarding the notification from the wireless base station to the second participant.

10. The method as in claim 1 further comprising:
including an identity of a first participant in the map in an absence of receiving location specific data from a first communication device operated by the first participant indicating that the first communication device resides in the region of wireless coverage provided by the wireless base station.

11. The method as in claim 1 further comprising:
detecting presence of the participants in the region of wireless coverage provided by the wireless base station based on wireless communications received from mobile devices operated by the participants, the wireless communications lacking location specific data indicating whereabouts of the mobile devices.

12. The method as in claim 1 further comprising:
producing the map to include identities of fewer-than-all users detected as being present in the region of wireless coverage, the identities of the fewer-than-all users included in the map in response to detecting that the fewer-than-all users are members of a common organization.

13. The method as in claim 1, wherein the map is a first social network map keeping track of a first group of multiple users: i) that are currently in wireless communication with the wireless base station and ii) that had a pre-existing social association with each other prior to being detected as present in the region of wireless coverage, the method further comprising:

producing a second social network map to keep track of a second group of multiple subscribers: i) that are currently in wireless communication with the wireless base station and ii) that had a pre-existing social association with each other prior to being detected as present in the region of wireless coverage based on communications with the wireless base station, the pre-existing social association of the first group of multiple users different than the pre-existing social association of the second group of multiple users.

14. The method as in claim 1 further comprising:
detecting presence of a particular subscriber in wireless communication with the wireless base station based on communications from a mobile communication device operated by the particular subscriber to the wireless base station; and
excluding an identity of the particular subscriber in the map in response to detecting that the particular subscriber does not have the pre-existing social association with the social network of participants included in the map.

15. The method as in claim 1 further comprising:
detecting presence of a particular subscriber in wireless communication with the wireless base station based on communications from a mobile communication device operated by the particular subscriber to the wireless base station;
accessing personal information associated with the particular subscriber; and
in response to detecting that the accessed personal information associated with the particular subscriber indicates that the particular subscriber has a corresponding social association with the social network of participants included in the map, including an identity of the particular subscriber in the map.

16. The method as in claim 15, wherein the particular subscriber is a first subscriber, the method further comprising:
populating the map to indicate that the first subscriber and a second subscriber are participants of the social network and simultaneously reside within the region of wireless coverage, the map indicating a social relationship between the first subscriber and the second subscriber; and
in response to detecting that the first subscriber previously conducted business with a business entity located in the region of wireless coverage and that the social relationship exists between the first subscriber and the second subscriber, transmitting an advertisement from the wireless base station to the second subscriber, the advertisement indicating presence of the business entity in the region of wireless coverage.

17. The method as in claim 1 further comprising:
communicating a location-specific coupon on behalf of a business entity in the region of wireless coverage to a first participant of the participants in the social network; and
in response to detecting redemption of the location-specific coupon by the first participant, recording a business relationship between the respective business entity and the first participant redeeming the location-specific coupon; and based on the business relationship, communicating notice of the business entity in the region of wireless coverage to a second participant of the participants in the social network.

18. The method as in claim 1 further comprising:
creating the map to include an identity of an identity of a first participant in response to detecting that the first participant operates a first communication device that communicates over a first wireless link to the wireless base station;
creating the map to include an identity of a second participant in response to detecting that the second participant operates a second communication device that communicates over a second wireless link to the wireless base station; and
in response to detecting that the first participant previously conducted business with a business entity located in the region of wireless coverage and that a social relationship exists between the first participant and the second participant, transmitting an advertisement from the wireless base station to the second participant, the advertisement indicating presence of the business entity in the region of wireless coverage.

19. A method comprising:
via computer hardware, performing operations of:
receiving advertisement information pertaining to a venue located within a wireless coverage region of a wireless access point, the wireless access point providing connectivity between subscribers operating corresponding mobile communication devices and a core network;
associating the advertisement information to the wireless access point;
producing a social network map to keep track of a social network of related subscribers currently operating mobile communication devices in wireless communication with the wireless access point;
populating the social network map to indicate that a particular subscriber currently resides within the wireless coverage region of the wireless access point and that the subscriber is part of the social network of related subscribers, the wireless access point detecting presence of the particular subscriber in the wireless coverage region based on receipt of a wireless communication signal transmitted by a mobile device operated by the particular subscriber to the wireless access point; and
from the wireless access point, and in response to detecting that the particular subscriber currently resides with the wireless coverage region based on the receipt of the wireless communication signal, transmitting a communication including the advertisement information to the particular subscriber;
wherein the advertisement information includes information about a business entity physically residing within the wireless coverage region, the method further comprising:
transmitting the communication from the wireless access point to a corresponding mobile device operated by the particular subscriber based at least in part in response to detecting that the particular subscriber previously conducted business with the business entity.

20. The method as in claim 19, wherein the particular subscriber is a first subscriber, the method further comprising:

via the wireless base station, detecting presence of a second subscriber present in the wireless coverage region based on communications received from a corresponding mobile device operated by the second subscriber;

identifying a social association between the first subscriber and the second subscriber, the social association indicating that the first subscriber and the second subscriber are both members of a common organization; and in response to detecting that the first subscriber previously conducted business with a business entity located in the wireless coverage region and the social association exists between the first subscriber and the second subscriber, transmitting the advertisement information to the corresponding mobile device operated by the second subscriber, the advertisement information indicating presence of the business entity in the wireless coverage region.

21. A method comprising:

using processor hardware, performing operations of:

producing a first social network map for a wireless access point, the first social network map tracking a first group of multiple subscribers that: i) are currently in wireless communication with the wireless access point and ii) had a pre-existing social association with each other prior to being detected as present in a region of wireless coverage provided by the wireless access point;

producing a second social network map for the wireless access point, the second social network map tracking a second group of multiple subscribers that: i) are currently in wireless communication with the wireless access point and ii) had a pre-existing social association with each other prior to being detected as present in the region of wireless coverage;

receiving a message transmitted over a wireless link from a first subscriber to the wireless access point, the wireless access point providing wireless connectivity between the first subscriber and a core network;

analyzing the message to identify the first subscriber;

populating the first social network map to include an identity of the first subscriber in response to detecting that the first subscriber currently is in wireless communication with the wireless access point and that the first subscriber is a member of the first group; and transmitting a communication from the wireless access point to the first subscriber, the communication transmitted to the first subscriber in response to detecting presence of the first subscriber within the region of wireless coverage.

22. The method as in claim 21, wherein the communication includes advertisement information indicating presence of a business entity within boundaries of the region of wireless coverage.

23. The method as in claim 21, wherein the message includes a query about presence of a particular type of business entity residing within boundaries of the region of wireless coverage; and wherein the communication is an answer to the query and includes information about a business entity in the region of wireless coverage that is of the particular type.

24. The method as in claim 21 further comprising:

detecting that the first subscriber previously conducted business with a business entity residing within boundaries of the region of wireless coverage; and wherein transmitting the communication from the wireless access point occurs in response to detecting that the first subscriber previously conducted business with the business entity.

25. The method as in claim 21 further comprising:

populating the map to indicate that the first subscriber and a second subscriber simultaneously reside within boundaries of the region of wireless coverage of the wireless access point;

identifying a social association between the first subscriber and the second subscriber; and transmitting a message from the wireless access point to the first subscriber, the communication indicating that the second subscriber is currently within the boundaries of the region of wireless coverage;

at the wireless access point, receiving a notification transmitted from the first subscriber to the second subscriber; and forwarding the notification from the wireless access point to the second subscriber.

26. The method as in claim 21, wherein the message transmitted over the wireless link from the first subscriber to the wireless access point includes review information pertaining to a business entity residing within boundaries of the region of wireless coverage, the method further comprising:

accessing the map to identify a second subscriber in the region of wireless coverage; and initiating distribution of the review information to the second subscriber.

27. The method as in claim 21 further comprising:

producing the first social network map to include identities of fewer-than-all users detected as being present in the region of wireless coverage, the identities of the fewer-than-all users included in the map in response to detecting that personal information associated with the fewer than all users indicates that the fewer-than-all users share the pre-existing social association.

28. The method as in claim 21 further comprising:

accessing personal information associated with the first subscriber to determine that the first subscriber has both the pre-existing social association with the subscribers in the first group and the pre-existing social association with the subscribers in the second group;

populating the second social network map to include the identity of the first subscriber in response to detecting that the first subscriber currently is in wireless communication with the wireless access point and that the first subscriber had the pre-existing social association with each of the multiple subscribers in the second group; and wherein the pre-existing social association with each of the multiple subscribers in the second group is different than the pre-existing social association with each of the multiple subscribers in the first group.

29. The method as in claim 21 further comprising:

populating the second social network map to include the identity of the first subscriber in response to detecting that the first subscriber is currently in wireless communication with the wireless access point and that the first subscriber is a member of the second group.

30. The method as in claim 29 further comprising:

populating the second social network map to include an identity of a second subscriber in response to detecting that the second subscriber currently is in wireless communication with the wireless access point and that the second subscriber is a member of the second group; and wherein the first social network map does not include the identity of the second subscriber.

31. The method as in claim 30 further comprising:

in response to detecting that the first subscriber previously conducted business with a business entity located in the region of wireless coverage and that a social relationship exists between the first subscriber and the second subscriber, transmitting an advertisement from the wireless base station to the second subscriber, the advertisement indicating presence of the business entity in the region of wireless coverage.

32. A system comprising:

a processor; and a hardware storage resource coupled to the processor, the hardware storage resource storing instructions that, when executed by the processor, cause the processor to:

create a map, the map representing a social network of participants: i) that currently reside in a region of wireless coverage provided by a wireless base station operating in a network environment, and ii) that have a pre-existing relationship with each other, the pre-existing relationship being a social association other than being present in the region of wireless coverage;

update the map to reflect changes in the social network in accordance with movement of the participants in and out of the region of wireless coverage; and from the wireless base station, initiate communications with the participants of the social network as specified by the map.

* * * * *